United States Patent [19]
Gerber

[11] Patent Number: 6,148,712
[45] Date of Patent: Nov. 21, 2000

[54] HYDRAULIC MULTIPOSITION VALVE, IN PARTICULAR A VALVE FOR SELECTING THE STEERING MODES OF VEHICLES WITH MULTI-AXLE STEERING

[75] Inventor: Jürg Gerber, Frutigen, Switzerland

[73] Assignee: Hydrotechnik Frutigen AG, Frutigen, Switzerland

[21] Appl. No.: 09/362,855

[22] Filed: Jul. 29, 1999

Related U.S. Application Data

[63] Continuation of application No. 09/089,343, Jun. 3, 1998, abandoned.

[30] Foreign Application Priority Data

Jun. 3, 1997 [GB] United Kingdom ............. 197 23 219

[51] Int. Cl.[7] .................................................. F15B 11/00
[52] U.S. Cl. ............................. 91/523; 91/524; 91/530; 91/536; 137/596.17; 137/596.2
[58] Field of Search ............................ 91/375 R, 508, 91/525, 521, 523, 524, 530, 536; 137/636.1, 596.2, 596.17

[56] References Cited

U.S. PATENT DOCUMENTS

| | | | |
|---|---|---|---|
| 1,663,513 | 3/1928 | Howse | 91/523 X |
| 2,970,571 | 2/1961 | Pecchenino | 121/38 |
| 3,485,315 | 12/1969 | Bergren | 137/596.2 X |
| 3,820,438 | 6/1974 | Kobelt | 91/524 X |
| 3,900,090 | 8/1975 | Kobelt | 91/524 X |
| 4,003,447 | 1/1977 | Weyer | 180/140 |
| 4,747,424 | 5/1988 | Chapman | 137/596.17 X |
| 5,497,692 | 3/1996 | Marcott | 91/523 |

FOREIGN PATENT DOCUMENTS

| | | | |
|---|---|---|---|
| 100420 | 2/1925 | Australia | 91/524 |
| 2281701A | 3/1976 | France. | |
| 479717 | 7/1929 | Germany | 91/524 |
| 803 573 | 4/1951 | Germany. | |
| 1 650 514 | 8/1970 | Germany. | |
| 1 921 330 | 11/1970 | Germany. | |
| 1 675 426 | 12/1970 | Germany. | |
| 1 750 380 | 2/1971 | Germany. | |
| 39 04 920 A1 | 8/1989 | Germany. | |

*Primary Examiner*—Hoang Nguyen
*Attorney, Agent, or Firm*—Burns, Doane, Swecker & Mathis

[57] ABSTRACT

The invention relates to a hydraulic multiposition valve, in particular a valve for selecting the steering modes of vehicles with multi-axle steering, having one or more position-seat valves (31, 33, 35, 37, 39, 41, 43), which have at least two switching positions and which communicate via lines for the hydraulic medium with one another and with a number of controlled connections (A, B, C, D; L, R) in such a manner that the desired switching positions of the multi-position valve (13) can be selected by the actuation of the seat valves (31–43); and having an actuating arrangement (29) for actuating the seat valves (31–43); the actuating arrangement (29) can be locked in detent fashion in the switching positions of the multiposition valve (13).

7 Claims, 6 Drawing Sheets

HYDRAULIC MULTIPOSITION VALVE, IN PARTICULAR A VALVE FOR SELECTING THE STEERING MODES OF VEHICLES WITH MULTI-AXLE STEERING

This application is a continuation, of application Ser. No. 09/089,343, filed Jun. 3, 1998, now abandoned.

FIELD OF THE INVENTION

The invention relates to a hydraulic multiposition valve, in particular a valve for selecting the steering modes of vehicles with multi-axle steering, having the characteristics of the preamble to claim 1.

BACKGROUND OF THE INVENTION

Steering mode selection valves are used in hydrostatic vehicles with multi-axle steering, preferably vehicles with two steering axles such as mobile dredgers, street-cleaning, equipment, rotary snowplows, rollers, and the like. The steering mode selection valves are used to select the desired steering mode, and in particular to make a selection between front-axle steering, rear-axle steering, two-axle steering, and crab steering.

Such steering mode selection valves are known in the most variant forms. For instance, a steering mode selection valve may be embodied as a hand-actuated rotary slide valve, however, this version has the disadvantage that because of the functionally dictated play between the rotary slide and the valve housing, the pressure medium leaks, and this leakage can hardly be reduced to desired values at feasible expense. Moreover, as a rule there is a demand in a steering mode selection valve to allow the selection valve to be mounted in the driver's cab, to assure convenient operation of the vehicle. In hand-actuated rotary slide valves, this requires a complicated course of the lines, because it is understood that the pressure medium must be brought as far as the valve.

Electrically actuatable slide valves are also known which while they do avoid this last disadvantage of hand-actuated valves nevertheless still have the disadvantage of leakage. Known electrically actuated slide valves are often embodied as detent-locked slide valves. These valves have a magnet-actuated piston which can be switched from a middle position into two further switching positions, and the piston locks in these two further positions in detent fashion so that the actuation forces need not be maintained constantly. In such steering mode selection valves, only three steering modes can therefore be selected.

It is moreover known to construct a steering mode selection valve from a plurality of position-seat valves which communicate with one another over corresponding lines. By using seat valves, the disadvantage of leakage as in slide valves is avoided. Since in valves embodied in this way it is undesirable for a human operator to have to actuate a plurality of valves in order to select one steering mode, these steering mode selection valves in principle have electrically actuatable position-seat valves, which can be triggered in the desired way from the control unit. However, this dictates the disadvantage that if an electrical actuating arrangement is defective or if there is a voltage failure, valve positions can arise that are not immedately definable and are extremely dangerous. This can lead to sudden establishment of the wrong steering mode, where the operator does not notice this until the vehicle reacts in an unexpected way. Hence in such cases there is a direct threat to the vehicle, the operator, and the surroundings of the vehicle.

OBJECT AND SUMMARY OF THE INVENTION

With this prior art as the point of departure, it is the object of the invention to create a hydraulic multiposition valve, in particular a valve for selecting the steering modes of vehicles with multi-axle steering, which overcomes the above disadvantages and which in particular makes it possible to select a switching position securely and at the same time to avoid leakage in the valve.

This object is attained by the invention with the characteristics of claim 1.

The invention proceeds from the recognition that to avoid leakage, the multiposition valve must be construction from one or more position-seat valves. The individual position-seat valves must be actuatable with an actuating arrangement which can be locked in detent fashion in both switching positions of the seat valves.

As a result the advantage is obtained that even if the power supply for the preferably electrically triggerable actuating arrangement fails, no undesired or undefinable switching states can occur.

In one embodiment of the invention, a separate actuating device may be provided for each position-seat valve, and the various actuating devices together form the actuating arrangement. Each actuating device is embodied such that detent locking occurs in both switching positions of the position-seat valves.

In this case, for instance, each position-seat valve can be actuatable electromagnetically. However, in that case, the detent lockability of each actuating device must be provided for separately. Furthermore, in extreme cases, it can happen that undesired switching states will still occur: This might be the case for instance if coincidentally the power supply occurred precisely at the beginning of or during a switching operation. If in this case fully synchronized actuation of the individual position-seat valves is not assured, then theoretically it is conceivable that some of the seat valves may have already switched, while the rest of the seat valves are still in their original position.

To avoid this, in the preferred embodiment of the invention the actuating arrangement is embodied such that a mechanical coupling of the seat valves is present. It is understood that in this embodiment the actuating arrangement is embodied such that the switching operation can be tripped electrically, so that the multiposition valve can be provided at an arbitrary point in the vehicle and only electrical control lines have to be extended from the preferred control site to the multiposition valve.

In the preferred embodiment, the multiposition valve has an actuating arrangement, and for each seat valve a cam disk disposed on a shaft is provided, which disk acts upon the respective seat valve.

This has the advantage of a very simple mechanical coupling of the seat valves and a simple realization of synchronized actuation of the valves. Moreover, it is possible in this way to actuate a plurality of seat valves, so that even a conceivable number of switching positions is feasible, within practical limits.

In the preferred embodiment of the invention, the shaft of the actuating arrangement, is connected to a ratchet mechanism, which brings about a detent-locking segmental rotary motion of the shaft.

The ratchet mechanism preferably has a toothed wheel, which is rotatable by means of a movable actuating element. A reverse rotation of the toothed wheel is prevented by means of a latch element.

In the preferred embodiment of the invention, the actuating element is embodied as an annular element that is rotatable concentrically with the toothed wheel, in which annular element a resiliently acted upon driving element is provided which acts upon the teeth of the toothed wheel. The latch element is embodied as a pin that is resiliently acted upon essentially in the radial direction or in a direction slightly inclined therefrom.

The rotatable annular element is connected to a substantially linearly movable actuating tappet, so that an essentially linear motion of the actuating tappet is converted into a rotary motion of the annular element.

In the preferred embodiment, the actuating tappet is movable by means of an electromagnet.

The above-described structural embodiment of the actuating arrangement can be achieved at little expense and makes reliable synchronized actuation of the seat valves possible. The actuating arrangement embodied in this way can also be used with arbitrarily embodied positional valves, which are suitably coupled to achieve the function of the multiposition valve.

In the preferred embodiment of the invention, it is provided that the actuating arrangement is manually actuatable, if the controlled motion fails. To that end, by way of example, the actuating tappet which is actuatable by means of an electromagnet may be embodied such that its free end is manually actuatable. Thus even in emergency situations, actuation of the multiposition valve is possible.

Further embodiments of the invention are recited in the dependent claims.

The invention will be described in further detail below in terms of an exemplary embodiment shown in the drawing.

Description of the Preferred Embodiments

Figure 1:
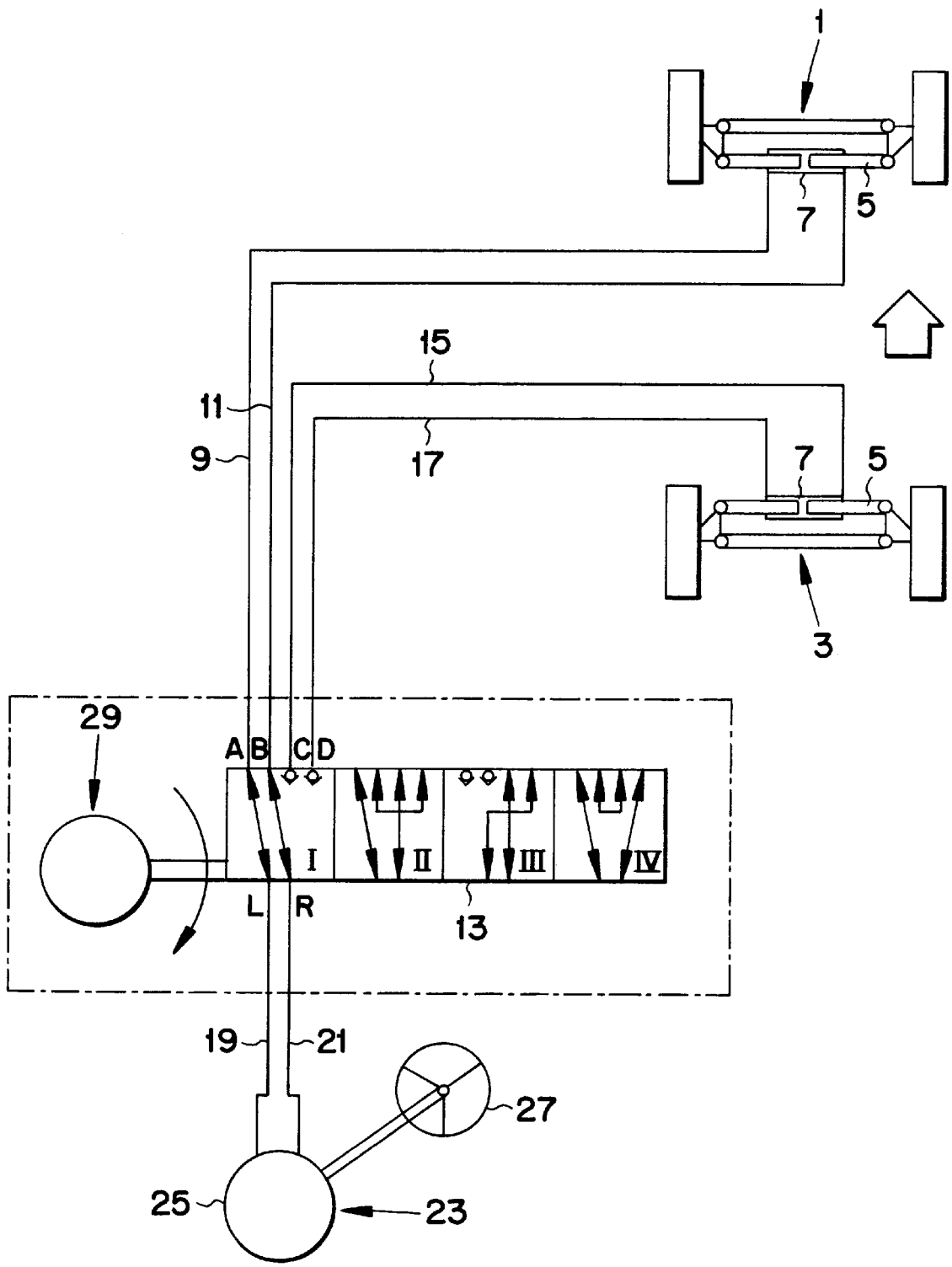
FIG. 1 schematically shows a vehicle with two-axle steering, using a ⁴/₄-steering mode selection valve.

FIG. 1 schematically shows the components of a vehicle with two-axle steering, to the extent that they are needed to comprehend the invention. The vehicle, not shown in further detail, has a front axle 1 and a rear axle 3, each of which is embodied as steerable. To that end, each axle has a translationally movable steering gear 5, which is movable by means of a hydraulic cylinder 7.

The hydraulic cylinder 7 of the front axle 1 communicates via hydraulic lines 9, 11 with connections A, B of a ⁴/₄-steering mode selection valve 13.

Other connections C, D of the steering mode selection valve 13 communicate with the hydraulic cylinder 7 of the rear axle 3 via hydraulic lines 16, 17.

If one of the hydraulic cylinders 7 is acted upon by the hydraulic medium on one side, then the applicable steering gear 5 of the respective axle 1, 3 moves in the direction determined by the pressure force and induces a corresponding steering operation. The swiveling motion of the applicable wheel is attained by means of one schematically shown steering suspension each. For instance, if the hydraulic cylinder 7 of the front axle is acted upon with the pressure medium via the line 9, then the steering gear 5 moves to the right, creating the steering motion of the wheels of the front axle 1 toward the left. Correspondingly, by action on the hydraulic cylinders 7, the desired steering motions of the axles 1, 3 can be brought about.

The steering mode selection valve 13 has two further connections L, R, which are connected via hydraulic lines 9, 21 to a steering controller 23 of the vehicle.

The steering controller 23 includes a unit 25 whose outputs are connected to the hydraulic lines 19, 21. The unit 25 is coupled to a steering wheel 27 of the vehicle. When the steering wheel 27 is turned to the left, the unit 25 brings about an inflow of hydraulic medium into the line 19. Correspondingly, when the steering wheel is turned to the right the unit 25 brings about an inflow of hydraulic medium into the hydraulic line 21 in the direction of the steering mode selection valve 13. The quantity of hydraulic medium delivered into the respective line 19, 21 depends on the rotational angle of the steering wheel 27.

In the embodiment shown in FIG. 1, the steering mode selection valve 13 has four switching positions, marked I, II, II, IV.

Switching position I defines exclusive control of the vehicle by means of the front axle (front-axle steering), while switching position III defines exclusive control of the vehicle by means of the rear axle 3 (rear-axle steering). Switching position II brings about two-axle steering, in which the front axle 1 and rear axle 3 are each triggered in the same direction. In other words, at the same time, a steering motion of both the front and rear axle to the right or left is generated at the same time. The switching position IV brings about so-called crab steering of the vehicle, in which the front axle 1 and the rear axle 3 are each triggered in opposite directions. In other words, if at the front axle 1 a steering motion to the left is brought about, then at the rear axle 3 a steering motion to the right is generated, and vice versa.

To select the steering modes in switching positions I–IV, the steering mode selection valve 13 has an actuating arrangement 29. The actuating arrangement includes at least one or more mechanical actuators for actuating the valve positions, and the selection of valve positions can be done by means of electrical triggering (not shown) of the actuating arrangement.

Figure 2A:
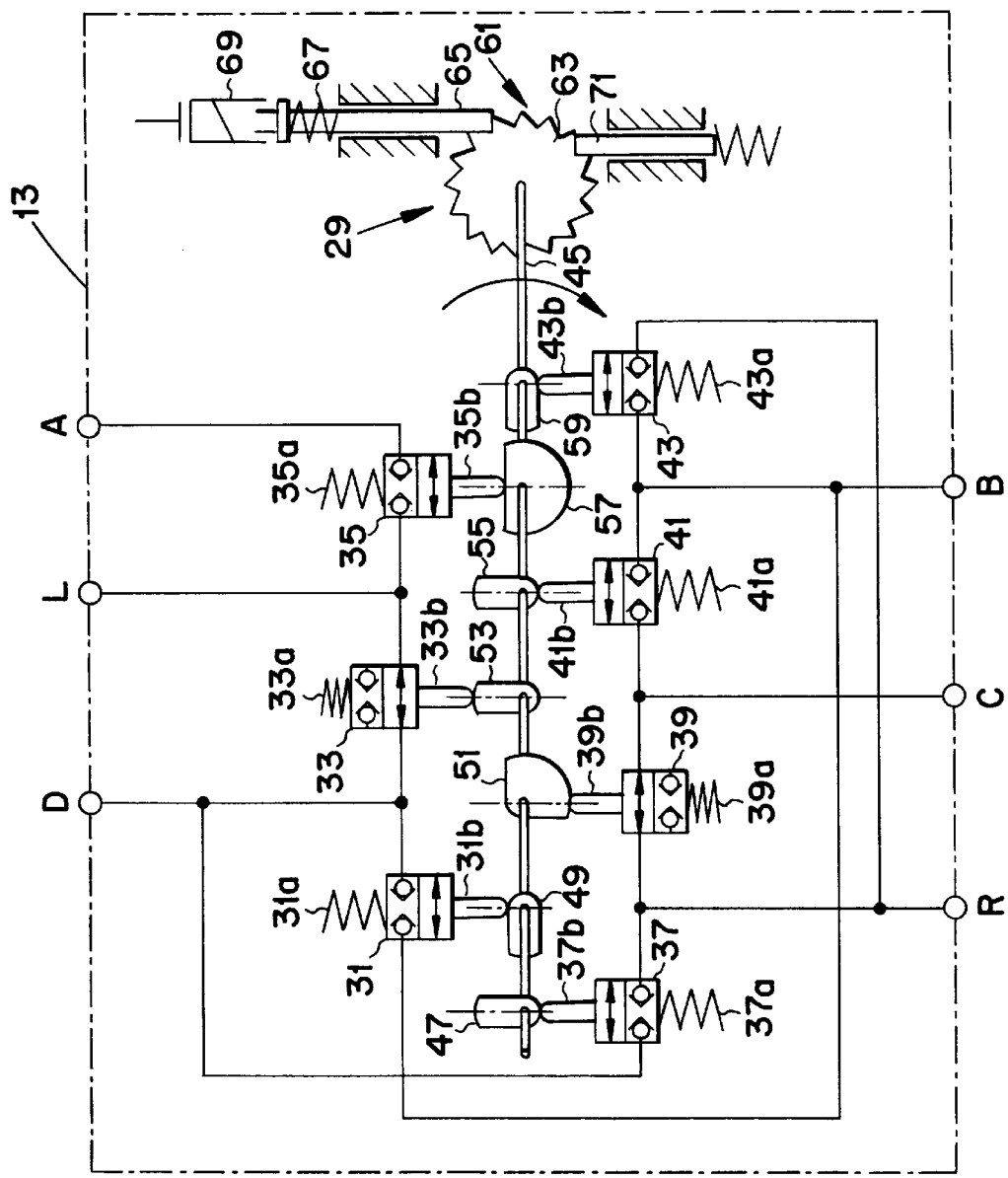
FIG. 2 schematically shows one embodiment of the hydraulic ⁴/₄-way valve according to the invention for the vehicle in FIG. 1, in various switching positions (FIGS. 2*a*: rear axle steering.
FIG. 2*b*: front axle steering.
FIG. 2*c*: two-axle steering.
FIG. 2*d*: crab steering)

FIG. 2*a* shows the schematic layout of the steering mode selection valve 13 of the invention; switching position III is shown, that is, rear-axle steering of the vehicle.

As can be seen from FIG. 2*a*, the ⁴/₄-way valve 13 is formed by a total of seven ²/₂-way valves 31, 33, 35, 37, 39, 41, 43, which communicate via hydraulic lines in such a way that the switching positions I–IV of the steering mode selection valve 13 can be realized by means of corresponding switching positions of the ²/₂-way valves 31–43.

The ²/₂-way valves are embodied as seat valves, each of which has one open position and one blocked position. Embodying them as seat valves offers the advantage that in the blocked state, no leakage whatever occurs.

Each of the ²/₂-way valves are actuated by means of resilient elements 31*a*–43*a* in such a way that if the actuating motion is absent they are transferred to the blocked state.

For actuating the position-seat valves 31–43, these valves each have a respective tappet 31*b*–43*b*.

The actuating arrangement 29 of the exemplary embodiment shown in FIGS. 2*a*–2*d* includes a shaft 45, on which cam disks 47, 49, 51, 53, 55, 57, 59 are provided. The cam disks 47–59 are solidly joined to the shaft 45, so that upon a rotation of the shaft 45, the tappets 31b–43b of the position-seat valves 31–43 are actuated in the desired way by the cam disks. To that end, it is understood that the contours and phase relationships of the cam disks be selected in a suitable way.

In the rear axle steering shown in FIG. 2a, only the cam disks 53 and 61 act upon the valves 33 and 39, so that in each case a connection of the input L to the output D and a connection of the input R to the output C of the steering mode selection valve 13 is made. All the other position-seat valves are in the blocked state.

Figure 2B:
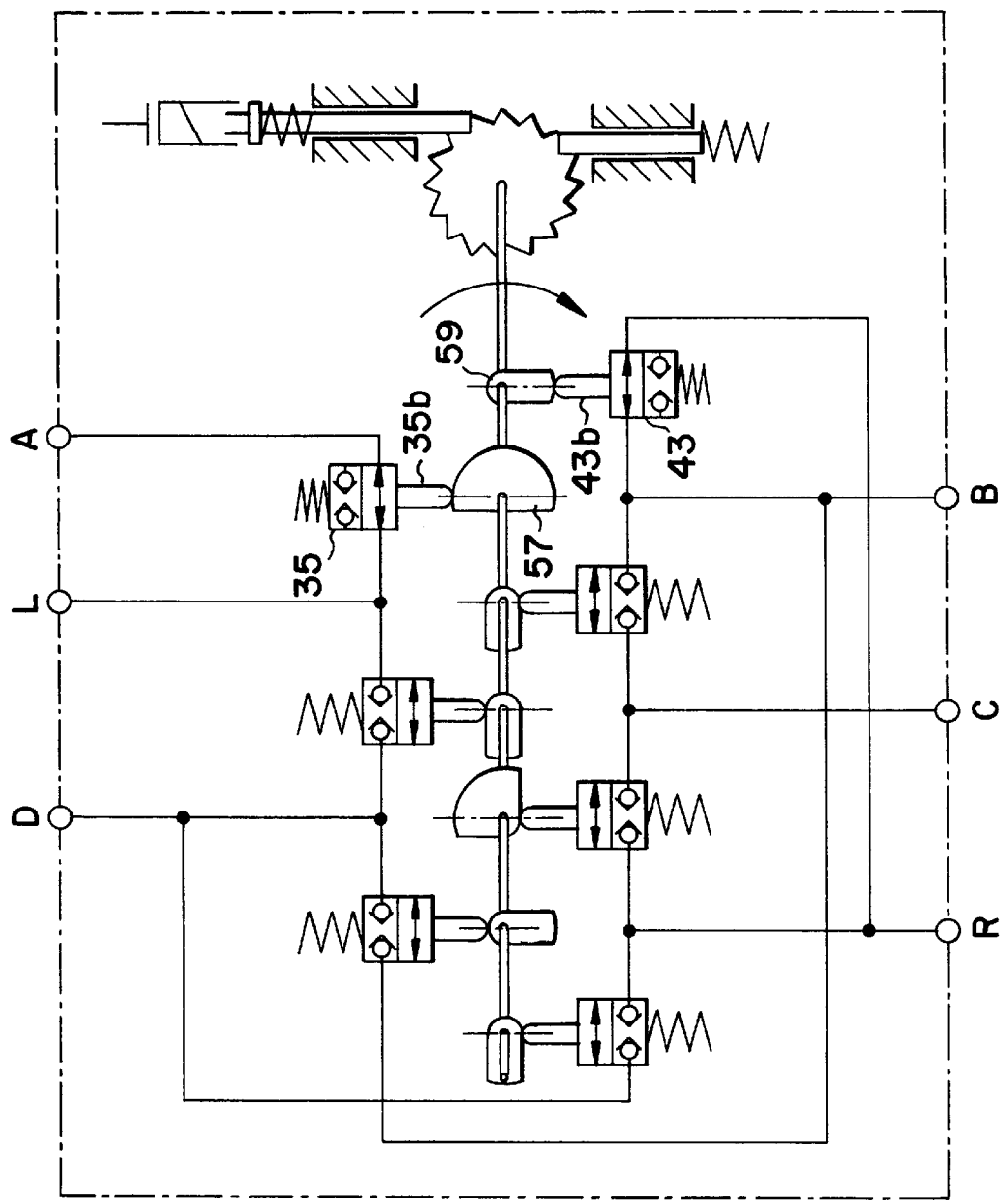

FIG. 2b, conversely, shows switching position I of the steering mode selection valve 13, i.e., front-axle steering, in which the input L is connected to the output A, and the input R is connected to the output B. To that end, as can be seen in FIG. 2b, only the position-seat valves 35 and 43 are in the open position and to that end are acted upon in a suitable way by the cam disks 57 and 59, respectively. All the other position-seat valves are again in the blocked state.

Figure 2C:
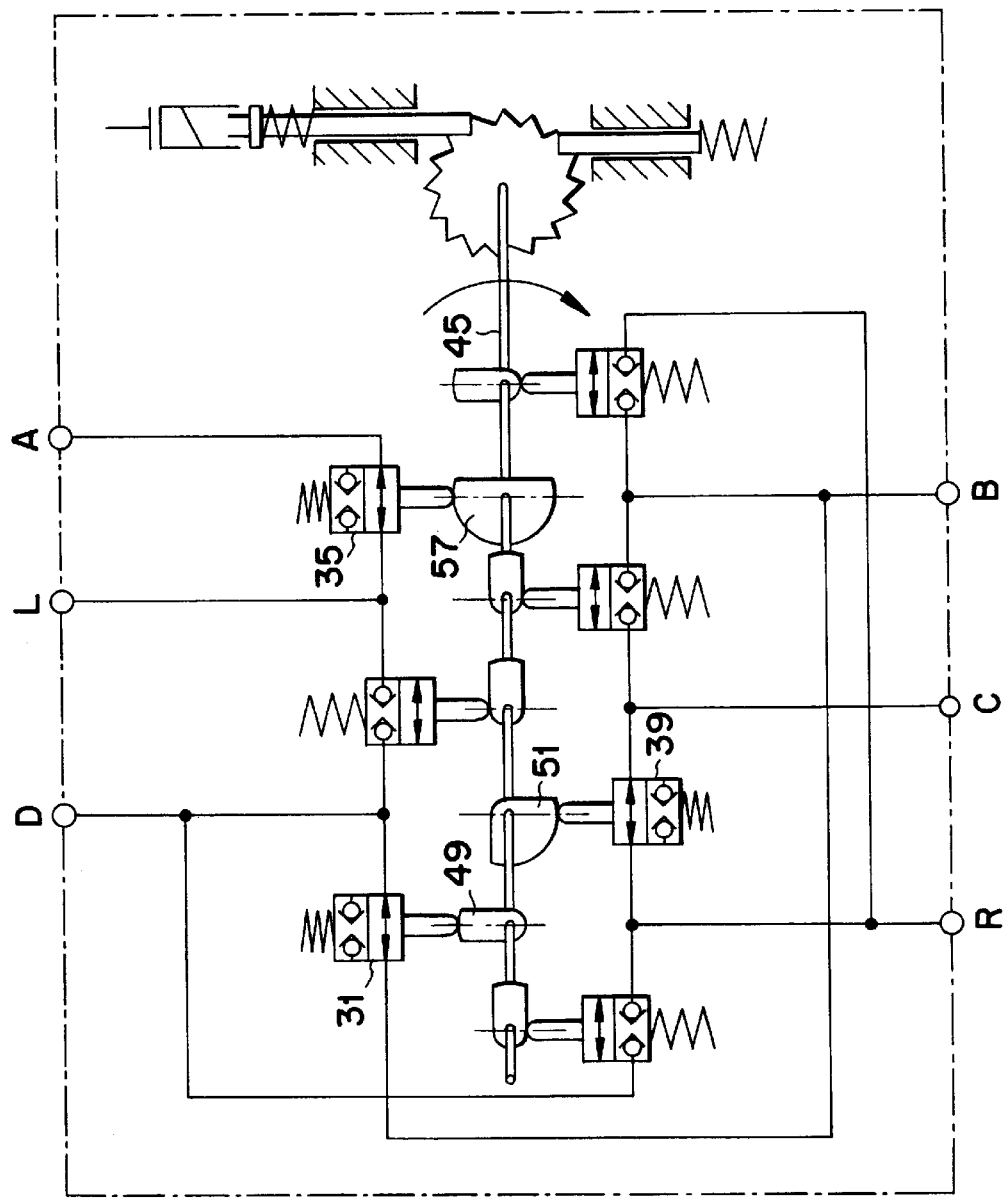

FIG. 2c shows two-axle steering of the vehicle, in which the input L of the steering, mode selection valve 13 is connected to the output A and the input R is connected to the output C, and furthermore the outputs B and D are connected to one another. Thus when pressure is exerted by the line 19, for instance, the front axle 1 undergoes a steering motion to the left (pressure imposition by the line 9) and by pressure imposition through line 17 as a consequence of the communication with the "return line" 11, a steering motion to the left is also brought about at the rear axle 3.

Figure 2D:
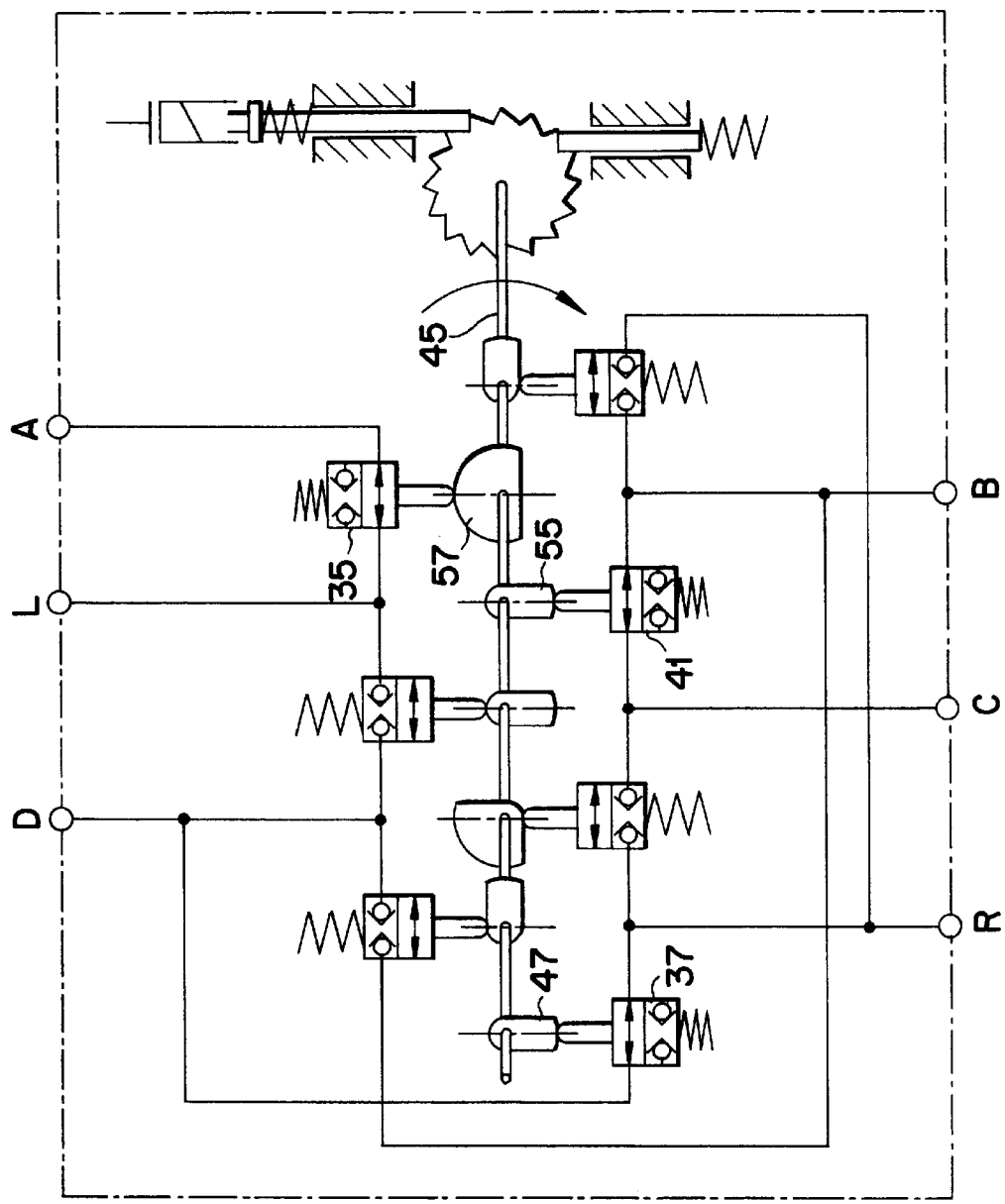

As can be seen in FIG. 2c, to that end the position-seat valves 31, 35 and 39 are controlled to the open state. This is done by a corresponding rotation of the shaft 45 via the cam disks 49, 51 and 57 associated with the respective seat valves. Finally, FIG. 2d shows the switching positions of the position-seat valves 31–43 for the switching position IV of the steering mode selection valve 13, that is, for so-called crab steering.

As can be seen from FIG. 1, to this end the input L may be connected to the output A, and the input R must be connected to the output D, and the output B must also be connected to the output C of the valve. To achieve this, the seat valves 35, 37, 41 must be directed to the closed state (see FIG. 2d). All the other seat valves are in the blocked state. In this switching position, when pressure is exerted through the line 19, for instance, the front axle 1 is steered to the left, while the rear axle 3, because of the communication of the "return line" 11 with the line 15, is steered to the right.

In order upon a rotation of the shaft 45 to direct only the appropriate seat valves into the open state, the cam disks must have the form and angular position relative to one another that can be seen in FIGS. 2a–2d. These depend naturally on the orientation of the tappets 31b through 43b of the seat valves 31–43. In this respect, the embodiment of the cam disks in FIGS. 2a–2d should be considered merely a schematic example.

As can be seen in FIG. 2a, the actuating arrangement 29 can have an actuating gear or detent locking gear 61.

The actuating gear comprises a toothed wheel 63, which is solidly connected to the shaft 45 and is acted upon by an actuating element 65 in the form of a displaceable tappet. The tappet 65 is retained in an outset position by a spring 67 and can be deflected vertically downward, in the exemplary embodiment shown in FIG. 2a, by means of an electromagnet 69. This causes a rotation of the toothed wheel 63 and thus of the shaft 45. The deflection of the actuating element 65 by the electromagnet 69 should be dimensioned such that upon each displacement motion of the actuating element 65, the toothed wheel 63 is rotated onward by an angular amount corresponding to one tooth each time.

After each displacement motion of the actuating element 65, this element is moved back again to the outset position by the spring 67, so that upon another activation of the electromagnet 69, another indexing onward of the actuating gear by one tooth of the toothed wheel 63 takes place.

To prevent reverse rotation of the toothed wheel 63, a locking latch 71, embodied as a spring-impinged displaceable tappet, engages the teeth of the toothed wheel 63.

It is understood that any arbitrary other actuating gear may be used, instead of the embodiment shown in FIGS. 2a–2d. In principle, an electric motor rotary drive is also suitable for moving the shaft 45. However, using an actuating gear has the advantage that at least in the switching positions, detent positions exist. To that end, naturally the actuating gear may also be embodied such that on each shifting operation of the actuating gear (by one tooth), a transition occurs from one switching position I–IV of the steering mode selection valve 13 to the respective next switching position.

Moreover, the use of an actuating gear makes it possible in a relatively simple way to achieve manual emergency actuation of the gear, in case the electromagnetic actuation of the actuating element 65 fails.

Figure 3:
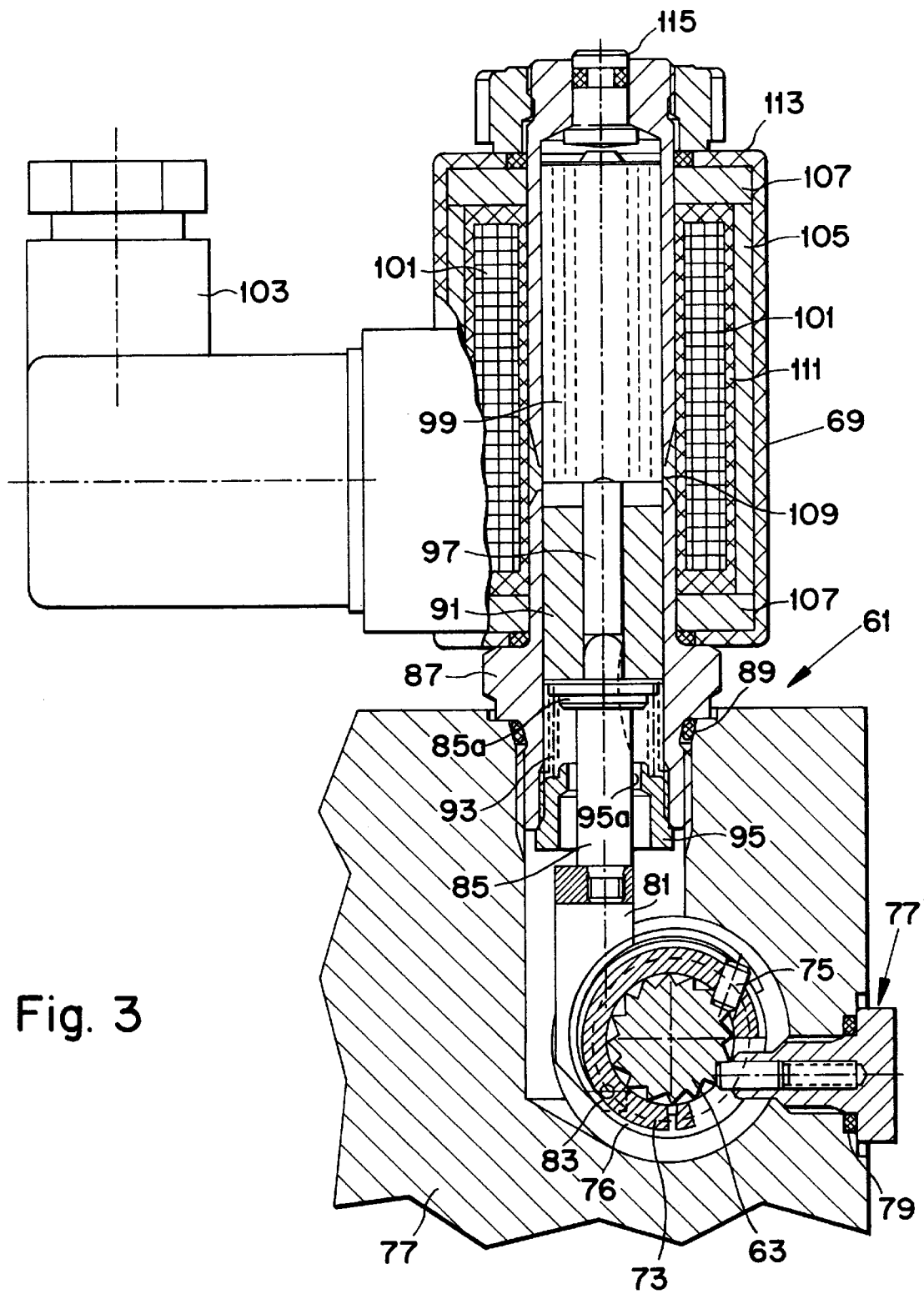
FIG. 3 is a view of a concrete exemplary embodiment of the actuating arrangement for the positional valve in FIG. 2.

FIG. 3 shows concrete embodiment for the actuating gear 61, in section.

The toothed wheel 63, which is solidly joined to the shaft 45 (not shown in FIG. 3) is surrounded by an annular element 73, which together with a driving element or pin 75 guided substantially radially displaceably in the annular element 73 forms the actuating element 65. The annular element 73 is surrounded on its outside by a curved resilient element 76, which with its resilient leg acts upon the outside of the pin 75, while a bent-over region of the other end of the spring 76, for the sake of connection with the annular element 73, engages a slit in the annular element 73.

The entire actuating gear 61 is disposed in a housing 77 of the steering mode selection valve 13. Also disposed in this housing 77 is the locking latch 71, which has a pin that acts upon the teeth of the toothed wheel 63. The pin is held displaceably and under spring action in a part that is screwed into the housing 77. Am O ring 79 for sealing purposes is disposed between the housing 77 and the retaining part of the locking latch 71.

The annular element 73, with a portion of its circumference, engages the inside of a fork 81 and is connected to the ends of the fork by means of a pivot pin 63. Upon a substantially vertical motion of the fork 81, accordingly, this substantially translational motion is converted into a rotary motion of the annular element 73.

An end of the tappet 85 that is provided with a thread is screwed into the upper region of the fork 81. The tappet engages the inside of a power region of a magnet tube 87 of the electromagnet 89.

The magnet tube has a male thread on its lower end, with which it is screwed into a bore with a female thread in the housing 77. For sealing off from the housing 77, an O ring 89 is again provided between a shoulder of the magnet tube 87 and the housing 77. Above the tappet 85 in the magnet tube 87, a stationary element 91 of a ferromagnetic material, preferably steel, is provided. The element 91 has a central bore which is engaged by an upper region of the tappet 85. Below this upper region, the tappet 85 has a flange 85a, which is acted upon by a spring 93 that is supported by its lower end on the top of a nut 95 that is screwed from below into the magnet tube 87. Thus in the inactive state of the electromagnet 69, the tappet 85 is moved with its flange 85a against the underside of the element 91, and in this way an outset position of the tappet 85 or of the annular element 73 is defined.

The nut 95 has a bore 95 a, which has a diameter slightly larger than the outer diameter of the tappet 85. As a result, adequate play for the tappet 85 is made possible, so that upon a vertical motion the tappet can execute a slight tilting motion, which is necessary in order to create a rotary motion of the annular element 73. On the other hand, the diameter of the bore 95a is selected to be small enough that adequate guidance of the tappet 85 is assured.

Inside the central bore of the element 91, the tappet 85 is acted upon from above by a pin 97, which is solidly joined to a main tappet 99. The main tappet 99 is guided displaceably substantially in the upper half of the magnet tube 87, that is, in a space above the element 91. The magnet tube is encompassed by a winding 101, whose terminals are extended outward into a plug element 103. The plug element 103 can thus be coupled with a cable, not shown in further detail, so that in this way the winding 101 can be acted upon by current.

When current is exerted on the winding 101, the winding generates a magnetic flux in a magnetic circuit, which is formed by the armature parts of ferromagnetic material 105, 107, by the upper portion of the magnet tube 87 and by the main tappet 99, as well as by the element 91 and the lower portion of the magnet tube 87. To avoid a magnetic short circuit, the magnet tube 87, in a middle region, has an insulating region 109 of a magnetically insulating material.

In this way it is assured that when current is imposed on the winding 101, the main tappet 99 together with the pin 97 is moved vertically downward. In this process the pin 97 acts upon the tappet 85, thus generating a rotary motion of the annular element 73, so that a shifting operation of the actuating gear is performed.

For the sake of completeness, it will be noted that the winding 101 is naturally shielded from the armature part 105 by an insulating layer 111. The armature parts 107 (which may be embodied as disks) and the armature part 105 are also surrounded by a further insulating layer 113, to protect them against environmental factors and mechanical damage.

On its upper end, the magnet tube 97 has a central bore, in which a manually actuatable emergency actuation pin is retained in displaceable fashion. This pin, on its lower end, has a region of widening diameter, so that together with an inner shoulder of the magnet tube 87 a stop is formed for the emergency actuation pin 115.

With its underside, the emergency actuation pin 115 acts upon the main tappet 99, so that even if the electromechanical actuation by an imposition of current on the winding 101 fails, manual actuation of the actuating gear is still possible. To that end, the upper end of the emergency actuation pin 115, which protrudes past the magnet tube 87 or is at least accessible at the upper end thereof, can be manually actuated.

What is claimed is:

1. A hydraulic multiposition valve for selecting the steering modes of vehicles with multi-axle steering, comprising a) several position-seat valves (31, 33, 35, 37, 39, 41, 43) which have at least two switching positions and which communicate via lines for the hydraulic medium with one another and with a number of controlled connections (A, B, C, D, L, R) in such a manner that the desired switching positions of the multiposition valve (13) can be selected by the actuation of the seat valves (31–43), and b) an actuating arrangement (29) for actuating the seat valves (31–43) which effects a mechanical coupling of the seat valves (31–43) and which is adapted for being locked in detent fashion in the switching positions of the multiposition valve (13), said actuating arrangement (29) comprising several cam discs (47, 49, 51, 53, 55, 57, 59) acting upon the seat valves (31–43) and disposed on a common shaft (45) and said actuating arrangement (29) further comprising a detent locking gear (61) rotatably driving the shaft (45).

2. A multiposition valve according to claim 1, wherein said detent locking gear is configured as a change speed gear.

3. A multiposition valve according to claim 1, including a toothed wheel (63) disposed on said shaft and being rotatable by means of a movable adjusting element (65).

4. A multiposition valve according to claim 3, wherein said adjusting element (65) is embodied as an annular element (73) that is rotatable concentrically with said toothed wheel (63), said annular element being provided with a slaving element (75) which is acted upon resiliently and acts upon the teeth of said toothed wheel (63).

5. A multiposition valve according to claim 4, wherein said annular element (73) is connected to a substantially linearly movable actuating tappet (81, 85, 97, 99).

6. A multiposition valve according to claim 5, wherein said actuating tappet (81, 85, 97, 99) is movable by means of an electromagnet (69).

7. A multiposition valve according to claim 1, wherein said actuating arrangement (29) is manually actuatable if the controlled motion fails.

\* \* \* \* \*